Aug. 16, 1938. A. COSTA DE BEAUREGARD 2,127,162
TEMPERATURE REGULATING MIXING APPARATUS FOR FLUIDS
Filed April 10, 1936      4 Sheets-Sheet 1

Patented Aug. 16, 1938

2,127,162

UNITED STATES PATENT OFFICE 2,127,162

TEMPERATURE REGULATING MIXING APPARATUS FOR FLUIDS

Amédée Costa de Beauregard, Paris, France

Application April 10, 1936, Serial No. 73,786
In Belgium November 23, 1935

11 Claims. (Cl. 236—12)

The present invention relates to temperature regulating mixing apparatus for fluids, and it is more especially, although not exclusively, concerned with automatic mixing apparatus for cold water and hot water intended to supply a mixture at a predetermined temperature.

The object of the present invention is to provide an apparatus of the kind above referred to which is better adapted to meet the requirements of practice than apparatus for the same purpose used up to the present time, and especially an apparatus working in a precise and reliable manner while of relatively small size.

An essential feature of the present invention consists in combining the thermostatic device included in the apparatus with a servo-motor including a structure forming a chamber of variable volume having at least one movable wall and a control system for varying the pressure in said chamber and consisting preferably of an ejector the outlet of which is controlled by said thermostatic means, the displacements of the movable wall that are thus produced being adapted to produce relative variations of the amounts of hot and cold fluids mixed in the apparatus.

According to another feature of the present invention the control system of the servo-motor is acted upon both by said thermostatic device and by said movable wall, the actions of these two elements taking place in opposite directions, so as to quickly bring said control system into its position of equilibrium.

Still another feature of the present invention consists in providing a pressure distributing device, or control valve, capable of feeding the control system of the servo-motor, for instance the ejector above referred to, with fluid from that of the two inlet conduits in which the pressure is higher.

Still another feature of the present invention consists in controlling the relative inflows of the two fluids at different temperatures by means of valves which are mechanically interconnected in such manner that one valve closes when the other opens and that the pressures exerted by the fluids on said valves are added to each other and tend to oppose the action of the servo-motor.

Still another feature of the present invention consists in arranging the thermostatic device in such manner that said device can deform freely between the member it controls and an adjustable stop, so that said thermostatic device begins to act on said member only after it engages said stop.

According to still another feature of the present invention, the servo-motor, instead of including only one chamber of variable volume, includes two chambers of variable volume the movable walls of which are rigidly interconnected and operatively connected with the valves controlling the inflow of the two fluids to the apparatus, so that the fluid pressures in these respective chambers act in opposite directions on said valves, one of these chambers being connected, for instance, to the control ejector of the servo-motor and the other to the source of motive fluid for said ejector.

Finally, according to still another feature of the present invention, the valve elements serving to control the respective inflows of fluids to the mixing chamber of the apparatus are arranged to form check valves capable of preventing the mixture of fluids formed in the apparatus from returning into either of the two inlet conduits.

These, and other features of the present invention will result from the following detailed description of some specific embodiments thereof.

Preferred embodiments of the present invention will be hereinafter described, with reference to the accompanying drawings, given merely by way of example, and in which.

In the following description, it will be assumed, in order to facilitate explanations, that the apparatus serves to the mixture of hot and cold water so as to obtain water at a predetermined temperature.

Figure 1:
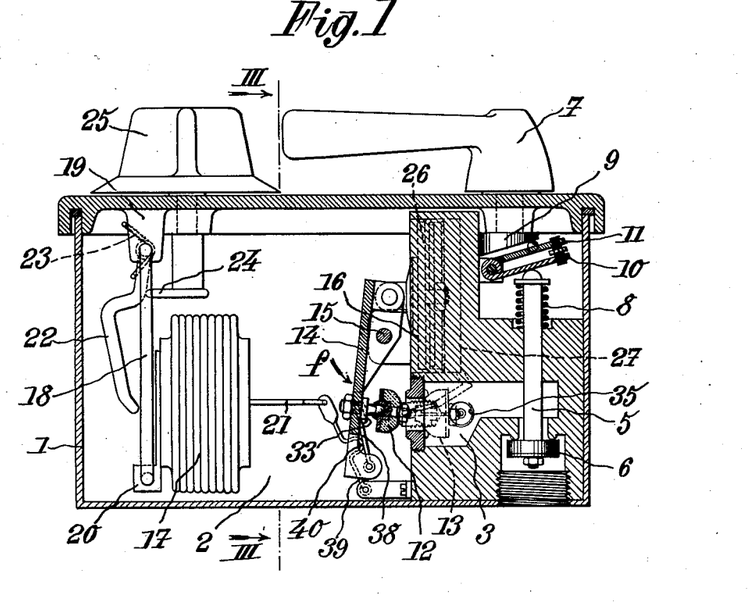
Fig. 1 is a sectional view on the line 1—1 of Fig. 2 of an automatic mixing apparatus for hot and cold water according to the invention.
Figure 2:
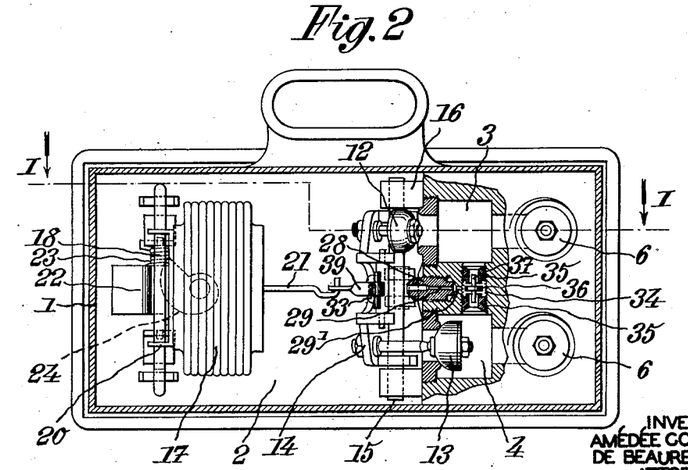
Fig. 2 is a bottom plan view of the same apparatus.
Figure 3:
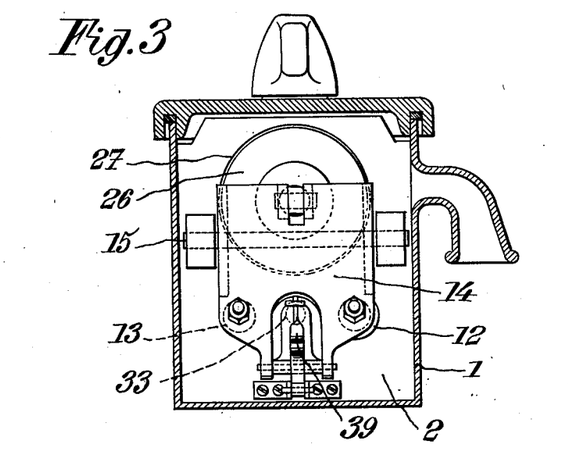
Fig. 3 is a sectional view on the line 3—3 of Fig. 1.
Figure 4:
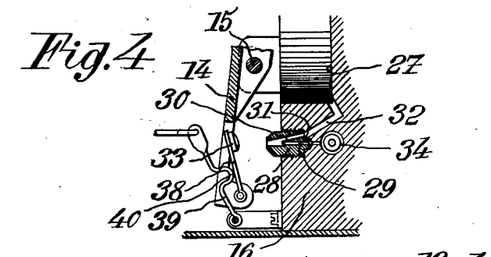
Fig. 4 is a part view in vertical section, showing a detail of Fig. 1.

In a casing 1, for instance of parallellepipedic shape, as shown by Figs. 1 to 4, I provide:

a) a thermostatic device, located for instance in the mixing chamber 2 provided in casing 1; and b) a servo-motor adapted to control valve means capable of varying the relative rates of inflow of hot water and cold water.

The operating element of this servo-motor consists of the movable wall of a chamber of variable volume said wall being displaced in response to variations of the pressure in said chamber. These variations of pressure are produced by a control system consisting preferably of an ejector or similar device operated by a fluid under pressure and the action of which is controlled by the thermostatic device.

The whole of the apparatus, with the exception of the servo-motor and the thermostatic device, may be made in any conventional or other manner.

For instance, referring more especially to the embodiment of Figs. 1 to 4, the apparatus is fed with hot water and cold water, respectively, through inlet conduits 3 and 4, the respective rates of feed of which are controlled through a double valve element 5. For instance, this valve element includes two valves 6 which can be simultaneously moved away from their respective seats by operating a handle 7 against the action of a spring 8. This handle acts on element 5 through a cam 9 and an adjusting device such, for instance, as a U-shaped lever the branches of which can be more or less forced apart from each other by acting on a nut 10 rigid angularly with a threaded rod 11 having right and left threads engaged in said branches.

The means for adjusting the relative rates of feed of the fluids from 3 and 4 to mixing chamber 2 are advantageously devised in such manner that the pressures exerted by the fluids on the valve members have their actions added to each other and tend, preferably, to bring the valve system into a position in which hot water flows and cold water is stopped.

For instance, as illustrated by Figs. 1 to 4, the valve members 12 and 13 are carried by a pivoting plate 14 journalled about a spindle 15 carried by the block 16 in which conduits 3 and 4 are provided. One of the valve members, preferably the valve 13 that controls the inflow of cold water, is arranged inside the corresponding inlet conduit, so that the stream of cold water tends to apply said valve member against its seat, while, on the contrary, the other valve member 12 is disposed in mixing chamber 2.

Advantageously, each of these valve members 12 and 13 is made of a shape such that the effort exerted on each of them by the fluid pressure remains substantially uniform during the opening and closing movements of said valve members. For instance these valve members are made of parabolic section.

Concerning now the thermostatic device intended to control, through the servo-motor, the plate 14 that carries the valve members, it is of any structure whatever, consisting, for instance, as shown by Figs. 1 to 4, of a bellows-shaped device 17.

Advantageously, according to an important feature of the invention, this thermostatic element can move freely between the member it controls and an adjustable stop.

For instance, as shown by the drawings (Figs. 1 to 4), thermostatic element 17 is supported by a U-shaped member 18 pivoted at one of its ends to the lid 19 of casing 1 and the other end of which is pivotally connected to a fork-shaped member 20 rigid with the rear face of thermostatic element 17.

On the other hand, a rod 21, rigid with the front face of said thermostatic element, acts on the control system of the servo-motor as it will be more fully explained hereinafter.

The adjustable stop above referred to consists of a plate 22, applied by a spring 23 against an eccentric cam 24 angularly fixed to an adjusting knob 25. Lid 19 is provided with a dial and knob 25 with a mark movable along the graduations of said dial. Of course the arrangement may be reversed, the graduations being carried by the knob and the mark by the lid of the casing. It will be readily understood that thermostatic element 17, with this arrangement, can expand freely and without influencing the control system of the servo-motor, as long as its rear face has not come into contact with stop plate 22.

Concerning now the servo-motor, its driving element advantageously consists of a single action cylinder-piston system the movable part (for instance piston 26) of which is pivoted to plate 14, whereas cylinder 27 is formed in block 16. Advantageously, the point of articulation of the rod of piston 26 on plate 14 is chosen in such manner that said piston tends, when it moves under the effect of an increase of pressure in its cylinder, to balance the action of the hot water and cold water pressures exerted on valve members 12 and 13.

This driving element of the servo-motor is combined with a control system consisting preferably of an ejector or the like connected in such manner to the inside of cylinder 27 through a conduit branching off from the main conduit of said ejector that the motive fluid flowing through said conduit creates (in a manner similar to that utilized in the Giffard apparatus) a suction in said branch conduit and therefore in said cylinder.

Advantageously, the device includes a threaded plug 28, adapted to be screwed in block 16. In this plug there is provided (see Fig. 4) a main conduit 29 fed with fluid under pressure as it will be hereinafter explained. There is also provided a branch conduit 30 communicating with cylinder 27 through a groove 31 provided around the end of plug 28 and through a conduit 32 extending between said groove and said cylinder.

It will be readily understood that, with such an arrangement, by combining with rod 21, rigid with the front end of thermostatic element 17, a valve member 33 capable of controlling the outlet of the ejector, the temperature of the fluid mixture formed in mixing chamber 2 determines the pressure transmitted, through conduits 30 and 32, to the inside face of piston 27 and therefore the position of equilibrium of said piston, which directly controls the relative positions of valve members 12 and 13, upon which the relative rates of flow of hot water and cold water depend.

I might feed the main conduit 29 of the ejector with motive fluid by connecting said conduit 29 with either of the inlet conduits 3 and 4. However, according to an important feature of the present invention, said main conduit 29 is fed with fluid under pressure through a pressure distributing device, or control valve, capable of bringing said conduit 29 into communication with that of conduits 3 and 4 in which the fluid pressure is higher.

According to the invention, I provide, between inlet conduits 3 and 4, a connecting passage 34, which is provided with inner threads and into which opens a conduit 29$^1$, provided in block 16 and prolonging conduit 29.

At either end of passage 34, there is screwed a threaded plug 35, provided with an axial hole.

Between these threaded plugs, I mount an oscillating valve 36, guided, for instance, by two fingers engaging respectively in holes provided axially in said plugs but with a certain play between said fingers and said holes.

It is perfectly obvious that, if conduits 3 and 4 are fed with fluids (hot water and cold water) at different pressures, valve 36 is applied against the plug 35 through the hole of which water at the lower pressure is fed, and conduit 29¹ is brought into communication with that of inlet conduits 3 and 4 in which the pressure is higher. I thus avoid that an accidental loss of pressure in one or the other of the inlet conduits 3 and 4 may produce a defective working of the servo-motor.

It should be noted that the use of such a pressure control valve is particularly advantageous when the feed pressures are low and are both of substantially the same value. Under these conditions, the pressure drops to a very low value in the conduit that is discharging water and the servo-motor is automatically connected to the other conduit in which there exists a higher pressure.

Finally, the apparatus includes an overflow or the like, which may be provided, for instance, on one of the lateral walls of casing 1.

The apparatus according to the present invention can work with the arrangement above described, that is to say by subjecting valve member 33 merely to the action of rod 21, rigidly connected to the front face of thermostatic element 17.

In this case, the apparatus works in the following manner:

When the feed valve system 5 is opened, that of the two streams of water (hot water and cold water) which is at the higher pressure flows through the conduit 29 of the ejector. This produces a suction in cylinder 27; piston 26 moves toward the inside of said cylinder and plate 14 is brought into a position in which valve member 13 is applied against its seat while valve 12 allows hot water to enter the mixing chamber 2. Thermostatic element 17 expands; it bears against plate 22; then rod 21 acts on valve member 33 which it tends to apply against the outlet of the main conduit 29 of the ejector. There is then produced a rise of the pressure inside cylinder 27 and piston 26 is driven out into a position for which valve 13 is moved away from its seat, so that cold water enters freely into chamber 2, while hot water is stopped by valve 12. The thermostatic element cools down and the inverse phenomenon takes place, and so on.

It is clear that such a working is unstable and that the obtainment of a mixture at a predetermined temperature results from a series of hit or miss adjustments. These alternate closings of conduits 3 and 4 produce water-hammer effects in said conduits and risk of injuring the water distribution system.

In order to obviate these drawbacks, I advantageously make use of an arrangement, which constitutes an important feature of the present invention, capable of being employed in connection with all temperature regulating mixers provided with a servo-motor.

According to this arrangement, instead of subjecting valve element 33 merely to the action of rod 21, I further cause the relative position of this valve 33 to depend upon the position of piston 26, in such manner that the two actions exerted on said valve member 33 are in opposite directions and tend to quickly bring said valve member into a position of equilibrium thereof, which corresponds also to the equilibrium of the servo-motor, for which the relative proportions of the rates of feed of hot water and cold water are such that the mixture that is obtained is at a predetermined temperature.

I may, for this purpose, employ the embodiment shown in the drawings.

In this case, valve member 33 is fixed at the end of a lever 38 the other end of which is pivoted to plate 14, and rod 21 is caused to act upon a suitably chosen point of said lever 38, for instance through a lever 39 pivoted to block 16, this lever 39 being provided with a projection 40 bearing against lever 39.

It will be readily understood that, if projection 40 is located at a distance from the pivot of lever 39 such that the displacements of the end of said projection 40, under the effect of the expansions of thermostatic element 17, are less rapid than the displacements of the point of lever 38 against which said projection bears, which displacements are produced by the movement of plate 14, on which lever 38 is pivoted, by piston 26 there takes place, when the apparatus is working, a self-adjustment resulting from the fact that, as soon as the servo-motor tends to pivot plate 14 in the direction indicated by arrow f, valve member 33 is moved away from the outlet of the ejector, the pressure inside cylinder 27 drops, and plate 14 tends to assume a position of equilibrium.

Whatever be the embodiment that is chosen the automatic water mixer according to the present invention has the following chief advantages:

a.—It occupies the minimum volume possible;

b.—Its operation is reliable and accurate since it includes no spring the variations of strength of which might alter the precision of the apparatus;

c.—The apparatus responds quickly to variations because of the provision of the pressure control valve which permits of always feeding the control system of the servo-motor with fluid at the higher pressure;

d.—Beats resulting from oscillations of the valve system for controlling the relative rates of flow of hot water and cold water are eliminated.

Figure 5:
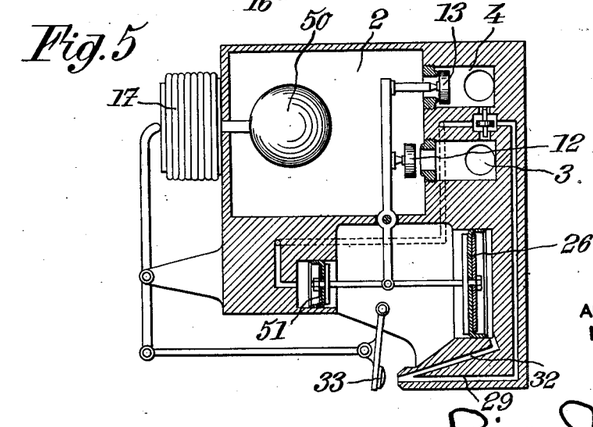
Fig. 5 is a diagrammatical view illustrating the principle of another embodiment of the apparatus according to the invention.

I may also, according to another embodiment of the present invention, which it is advantageous to employ when it is desired to feed a mixture under pressure, devise the apparatus as shown by Fig. 5.

The principle of this apparatus and the general arrangement of the parts is substantially the same as in the apparatus above described.

However, in this case, the thermostatic element 17 is located on the outside of the mixing chamber 2, and this thermostatic element is connected with a rigid reservoir 50 located inside said mixing chamber, this reservoir being filled with an expansible fluid.

As for the servo-motor, it includes a second system including a cylinder and a piston, adapted to act in a direction opposed to that of the first cylinder-piston system, the section of the piston 70 51 of this second cylinder-piston system being smaller than that of piston 26. This second cylinder-piston system is intended to replace the action exerted, in the first embodiment, by the fluid feed pressure on the valve members 12 and 13, since, in the embodiment that is now being considered, the action of this fluid feed pressure is considerably reduced due to the fact that the fluids are mixed under pressure in mixing chamber 2, which feeds an arrangement, such as a spray, from which the fluid escapes under pressure, so that the pressure in the mixing chamber is substantially equal to the mean value of the pressures in inlet conduits 3 and 4.

Figure 6:
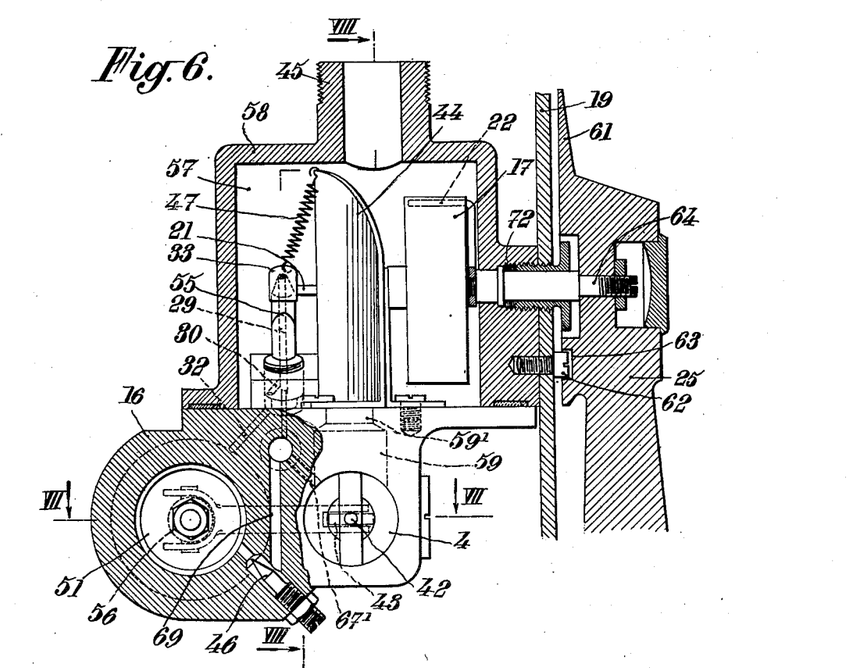
Fig. 6 is an elevational view, partly in section, of still another embodiment of the apparatus according to the invention.
Figure 7:
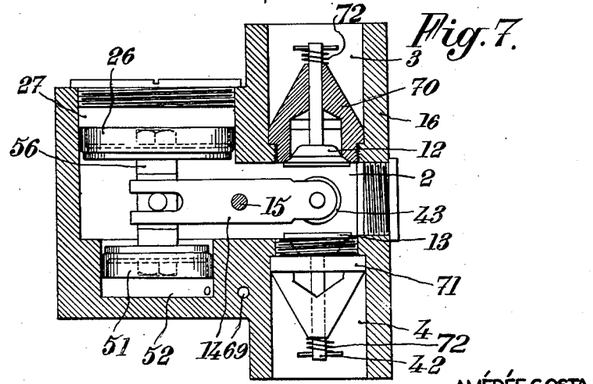
Fig. 7 is a sectional view on the line 7—7 of Fig. 6.
Figure 8:
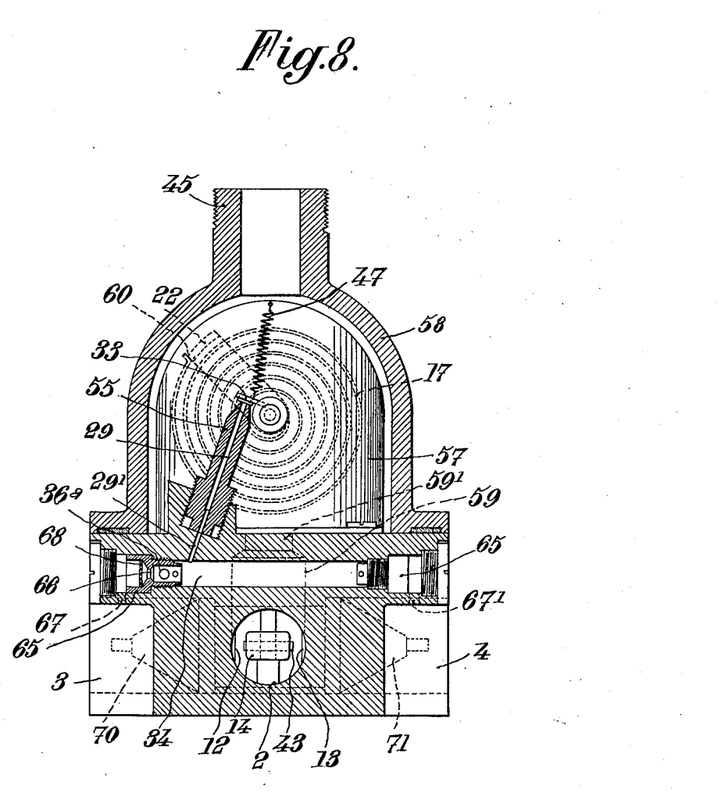
Fig. 8 is a sectional view on the line 8—8 of Fig. 6.

In the embodiment of the invention illustrated by Figs. 6 to 8 inclusive the general arrangement is similar to that above described, although the apparatus includes several new features.

As in the preceding embodiments, hot water and cold water are fed into a mixing chamber 2 through conduits 3 and 4, respectively, which conduits are provided in the body 16 of the apparatus.

The control system of the servo-motor consists of an ejector 55 capable, when the outlet of said ejector is more or less stopped by the thermostatic device, for instance through a valve member 33, of modifying the pressure existing in a variable volume chamber the movable wall of which serves to control the valve elements that adjust the respective rates of inflow of hot water and cold water to the mixing chamber.

For instance, as shown by the drawings, this variable volume chamber consists of a cylinder 27 in which there is fitted a piston 26 the rod 56 of which cooperates with the valve elements in question through a connecting rod 14, as it will be more fully explained in the following description.

The inside of this cylinder 27 communicated with the branch conduit 30 of ejector 55 through a conduit 32 provided in the body 16 of the apparatus.

As explained with reference to the first embodiment, ejector 55 can discharge its fluid into the mixing chamber 2. But, preferably, as illustrated by Figs. 6 to 8, said ejector opens into a chamber 57 located after said mixing chamber. For instance, as shown by the drawings, this chamber is limited by a bell-shaped structure 58, fixed to the body 16 of the apparatus and communicating with mixing chamber 2 through a conduit 59 which is advantageously provided with a portion of restricted section 59¹.

The main conduit 29 of ejector 55 is fed with fluid under pressure from a pressure control system adapted to operate as above described with reference to the first embodiment. Therefore, the ejector works under the effect of the difference of pressure existing between that of the two fluids to be mixed together which is at the higher pressure and the mixture present in chamber 57.

Concerning the thermostatic device, it consists advantageously, in this embodiment, of a compound metal strip 17, which is preferably spirally wound so as to reduce the space it occupies and to limit the importance of the elastic deformations it may undergo, said compound strip being advantageously mounted in chamber 57. Valve member 33 is then operated by one of the ends of this compound metal strip, for instance the central, or inner, end thereof, through a spindle 21 which also forms a support for said compound metal strip. The other end of said compound strip, 60, coacts with an adjustable stop. This stop consists, for instance, of a bent finger 22, the position of which is adjusted through a handle 25 provided with an index 61 movable along a dial 19, preferably graduated in temperatures, carried by part 58. Furthermore, this handle is advantageously combined, on the one hand, with a stop device, constituted, for instance, by a lug 62, screwed in said part 58 and adapted to slide in a groove 63 provided in the handle, and, on the other hand, with means for adjusting the angular position of said handle. These last means consist of a threaded rod 64 at one of the ends of which there is provided the finger 22 above referred to, while handle 25 is fixed to the other end of said rod through a locking nut, which permits, when initially adjusting the apparatus, of bringing index 61 exactly opposite the division of the dial that corresponds to the temperature of the mixture in chamber 57. Finally, it is advantageous to provide a stuffing box 72 for ensuring fluid tightness of member 58 at the place where spindle 21 extends therethrough.

Concerning now the pressure control valve system, it may be made in many various ways, but I have found it is advantageous to make use of the arrangement shown by the drawings and hereinafter described.

I provide, in the body 16 of the apparatus, a chamber 34, of substantially cylindrical shape, at the ends of which there are mounted check valve devices, consisting for instance of threaded plugs 65, in each of which there is movably mounted a ball 36a capable of stopping a hole 66 when the pressure in said chamber 34 becomes higher than the pressure existing in the inlet conduit communicating with said hole.

Chamber 34 communicates with inlet conduits 3 and 4, respectively, through conduits 67 and 67¹, preferably with the interposition of filters 68, which are disposed, for this purpose, before orifices 66.

I further provide, in the body 16 of the apparatus, a conduit 29¹ capable of connecting chamber 34 with the main conduit 29 of ejector 55.

Concerning now the servo-motor included in the apparatus, it may merely include a single piston 26 as above described (both strokes of said piston being then produced by the increase of pressure and the suction, respectively, which are produced in the pump body 27 according as ejector 55 is stopped or, on the contrary is free to discharge water). However, I consider that it is more advantageous to arrange the servo-motor in such manner that it can ensure the displacements of rod 14 in both directions under the effect of the difference of pressure between the fluid at higher pressure and the mixture of fluids present in chamber 2.

For this purpose, according to the embodiment illustrated by the drawings, I provide, in the body 16 of the apparatus, coaxially with cylinder 27, another cylinder 52 of a cross section smaller than that of cylinder 27 (advantageously the area of the cross section of cylinder 52 is one half of the area of the cross section of cylinder 27 when it is desired that the efforts exerted on rod 14 should be of the same intensity in both directions).

In this cylinder 52, I fit a piston 51 which is made rigid with the rod 56 of piston 26, the two pistons tending to produce displacements in opposite directions of this rod, respectively.

The inside of cylinder 52 is brought into communication with chamber 34, for instance through a conduit 69.

It will be readily understood that, with such an arrangement, for any direction of displacement of rod 56, the motive pressure is supplied by chamber 34 in which the pressure is that of the fluid feed conduit 3 or 4 in which the pressure is higher. When ejector 55 is in operation, the displacement of rod 56 and consequently rod 14 is produced by piston 51 since a certain vacuum is produced in cylinder 27. On the contrary, when the ejector is stopped, the preponderating action is exerted by piston 26, against the action of piston 51, since the area of piston 26 is equal to twice that of piston 51. The effort transmitted to rod 14 through rod 56 is substantially the same in both cases.

Concerning now the valve means for modifying the rates of feed of hot water and cold water respectively, preferably, in this embodiment of the invention, they are arranged in such manner as to constitute check valves capable of opposing the return of the fluid present in chamber 2 into either of the inlet fluid conduits 3 and 4.

This arrangement has the following advantage: When the apparatus is not in operation, that is to say no water is flowing therethrough, the arrangement above mentioned prevents short-circuiting of the distribution system through the apparatus, which would cause the fluid at the higher pressure to flow into the conduit corresponding to the fluid at the lower pressure. The persons fed with water by said distribution system would then risk getting hot water from the cold water conduit, and inversely getting cold water from the hot water conduit. This drawback is avoided with the arrangement above mentioned in a general manner and an embodiment of which will be hereinafter described.

Instead of providing a positive connection between the end of connecting rod 14 and the two valve members 12 and 13, I mount these two valve members separately. For instance, the seats of these two valve members are threaded plugs 70 and 71, provided with axial holes and which are screwed in the outlet ends of conduits 3 and 4, the holes of said plugs serving to guide the stems 42 of valve members 12 and 13.

These valves are mounted in such manner that they tend to open under the effect of a difference of pressure between the fluid in their respective conduits and the fluid mixture in the mixing chamber, with, of course, the higher pressure in the fluid feed conduit. Valves 12 and 13 may be either wholly free to move or provided with return springs 72 for returning them upon their respective seats.

The end of connecting rod 14 is arranged to coact with each of these valves 12 and 13 for instance through a roller 43 carried, for this purpose at the end of said connecting rod 14.

Advantageously, the apparatus according to the present invention further includes a metallic screen 44 arranged in such manner as to deviate the stream of fluid mixture escaping from the mixing chamber from the region of chamber 57 in which valve member 33 is present, in such manner that the position of said valve member 33 does not risk being modified by eddies of said stream of fluid mixture. Furthermore said screen serves to protect compound metal strip 17 against the direct influence of the jet of fluid discharged from ejector 55.

The apparatus is further provided with an outlet conduit 45, provided with inner threads, in which can be fitted a cock a connection, or any other equivalent device.

Preferably, I also provide means for adjusting the quickness of action of the servo-motor and therefore for avoiding the production of beats. For instance, these means include a needle valve 46 disposed in conduit 29¹, or, as shown in the drawings, on the conduit 69 through which the fluid at the higher pressure is fed from chamber 34 into cylinder 52, the whole of this last mentioned cylinder, its piston 51 and needle valve 46 working, in this case, as a dash-pot.

Eventually, there is provided a small spring 47 urging valve 33 in a rearward direction, which may be useful when ejector 55 works under the effect of a relatively small difference of pressure.

Whatever be the specific arrangement that is chosen, the working of the apparatus for automatically mixing hot water and cold water according to the embodiment illustrated by Figs. 6 to 8 results from the preceding explanations and needs not be further described.

Such an apparatus has many advantages, among which the following may be especially cited:

*a.*—Great simplicity of manufacture and relatively low cost due to the fact that the body of the apparatus can be cast as the body of a carburetter (the various conduits and orifices being thus cast in one piece with the body proper) and that the various organs, such as the valves, the ejector, the pistons of the servo-motor, etc., are machined independently and can be fitted very rapidly on said body.

*b.*—Extremely accurate operation, whatever be the feed pressures and the rate of discharge of the mixture that is formed, contrary to what takes place in apparatus in which the valve means are provided with springs capable of balancing the action of the servo-motor.

*c.*—No loss of water calling for an auxiliary conduit, due to the fact that the water fed by the ejector escapes from the apparatus through the mixture outlet conduit.

*d.*—Weight and space occupied by the apparatus greatly reduced as compared with those of apparatus for the same purpose existing at the present time.

*e.*—Finally, possibility of branching the apparatus on any existing installation, without involving the necessity of providing check valve means on each of the feed conduits, due to the fact that the valve members of the apparatus are check-valves.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus for mixing together fluids at different temperatures so as automatically to produce a fluid mixture at a predetermined temperature, which comprises, in combination, a casing forming a mixing chamber, two inlet conduits for supplying the respective fluids at different temperatures to said mixing chamber, means for controlling the flow of said fluids from said conduits, respectively, into said mixing chamber, a servo-motor including a structure forming two chambers of variable volume having two respective movable walls of unequal areas interconnected together and operatively connected with said fluid inlet control means, an ejector, operative by fluid under pressure, connected with that of the two last mentioned chambers the movable wall of which is of larger area, so as to exert a suction therein when in operation and to transmit therein the pressure of the motive fluid when not in operation, means for feeding motive fluid to said ejector, and means for feeding this motive fluid to the other of the two last mentioned chambers, and thermostatic means, responsive to variations of the temperature of the fluid mixture formed in the apparatus, for controlling the outlet of the ejector.

2. An apparatus for mixing together fluids at different temperatures so as automatically to produce a fluid mixture at a predetermined temperature, which comprises, in combination, a casing forming a mixing chamber, two inlet conduits for supplying the respective fluids at different temperatures to said mixing chamber, means for controlling the flow of said fluids from said conduits, respectively, into said mixing chamber a servo-motor including a structure forming two chambers of variable volume having two respective movable walls, one of which is of a surface equal to twice that of the other, means operatively interconnecting said movable walls to each other and to said fluid inlet control means, an ejector, operative by fluid under pressure, connected with that of the two last mentioned chambers the movable wall of which is of larger area, so as to exert a suction therein when in operation and to transmit therein the pressure of the motive fluid when not in operation, means for feeding motive fluid to said ejector, means for feeding this motive fluid to the other of the two last mentioned chambers, and thermostatic means, responsive to variations of the temperature of the fluid mixture formed in the apparatus, for controlling the outlet of the ejector.

3. An apparatus according to claim 1 in which the means for feeding motive fluid to said ejector are adapted to connect said ejector with that of the two inlet conduits in which the fluid pressure is higher.

4. An apparatus for mixing together two fluids at different temperatures so as automatically to produce a mixture at a predetermined temperature, which comprises, in combination, a casing forming a mixing chamber, two inlet conduits for supplying the respective fluids at different temperatures to said mixing chamber, two check valves for controlling the flow of the fluids from said conduits, respectively, into said mixing chamber, said check valves being movable independently of each other and arranged to permit the inflow of the respective fluids from said conduits into said mixing chamber but to prevent said fluids from flowing back from said mixing chamber to said conduits, a servo-motor including a structure forming at least one chamber of variable volume having a movable wall, adapted to limit the opening displacements of said check valves and an ejector, operative by fluid under pressure, connected with said last mentioned chamber so as to exert a suction therein when in operation and to transmit therein the pressure of the motive fluid when not in operation, and the thermostatic means, responsive to variations of temperature of the fluid mixture, formed in the apparatus, for controlling the outlet of said ejector.

5. A device as claimed in claim 4, in which the operative connection between the servo-motor and said valves comprises an oscillating lever having a portion arranged between said valves, whereby displacement of said lever modifies the relative maximum openings which said valves may take under the effect of the pressure in the conduits.

6. A device as claimed in claim 1, in which said fluid inlet control means comprises opposed check valves for controlling the flow of the fluids from said conduit, respectively, said check valves being movable independently of each other and arranged to permit the inflow of the respective fluids from said conduits but to prevent said fluids from flowing back into said conduits, the operative connection between the two movable walls and said valves comprising an oscillating lever operatively connected to said walls and having a portion arranged between said valves, whereby displacement of said lever modifies the relative maximum openings which said valves may take under the effect of the pressure in the conduits.

7. In a device as claimed in claim 1, said fluid inlet control means comprising opposed check valves for controlling the flow of the fluids from said conduit, respectively, said check valves being movable independently of each other and arranged to permit the inflow of the respective fluids from said conduits but to prevent said fluids from flowing back into said conduits, springs normally urging said check valves to closed positions.

8. An apparatus for mixing together two fluids at different temperatures so as automatically to produce a fluid mixture at a predetermined temperature, which comprises, in combination, a casing forming a mixing chamber, two inlet conduits for supplying the respective fluids at different temperatures to said mixing chamber, means for controlling the flow of the fluids from said conduits, respectively, to said mixing chamber, a servo-motor including two cylinders one of which is of a section equal to twice that of the other cylinder, two pistons fitting in a movable manner in said cylinders, respectively, so as to be urged in opposite directions by an increase of pressure in their respective cylinders, both of these pistons being rigidly interconnected together, and adapted to control said fluid inlet control means, an ejector, operative by fluid under pressure, connected with the cylinder of larger section so as to exert a suction therein when in operation and to transmit therein the pressure of the motive fluid when not in operation, means for feeding, as motive fluid to said ejector, the fluid from that of said conduits in which the pressure is higher, and means for connecting this last mentioned conduit with the other of the two cylinders, and thermostatic means, responsive to variations of the temperature of the fluid mixture formed in the apparatus, for controlling the outlet of said ejector.

9. An apparatus for mixing together two fluids at different temperatures so as automatically to produce a mixture at a predetermined temperature, which comprises, in combination, a casing forming a mixing chamber, two inlet conduits for supplying the respective fluids at different temperatures to said mixing chamber, means for controlling the flow of the fluids from said conduits, respectively into said mixing chamber, a servo-motor including a structure forming at least one chamber of variable volume having a movable wall operatively connected with said fluid inlet control means and an ejector, operative by fluid under pressure, connected with said last mentioned chamber so as to exert a suction therein when in operation and to transmit therein the pressure of the motive fluid when not in operation, means for feeding, as motive fluid to said ejector, the fluid from that of said conduits in which the pressure is higher, and thermostatic means, responsive to variations of the temperature of the fluid mixture formed in the apparatus, for controlling the outlet of said ejector.

10. An apparatus for mixing together two fluids at different temperatures so as automatically to produce a mixture at a predetermined temperature, which comprises, in combination, a casing forming a mixing chamber, two inlet conduits for supplying the respective fluids at different temperatures to said mixing chamber, two valves for controlling the flow of the fluids from said conduits, respectively, into said mixing chamber, means for mechanically interconnecting said valves so that the opening of one of them corresponds to the closing of the other, said valves and said last mentioned means being so arranged that the fluid pressure acting on said valves tends to simultaneously close one and open the other, a servo-motor including a structure forming at least one chamber of variable volume having a movable wall operatively connected with said mechanical means so as to act in opposition with the action of the fluid pressure thereon, an ejector operative by fluid under pressure connected with said last mentioned chamber so as to exert a suction therein when in operation, and to transmit therein the pressure of the motive fluid when not in operation, means for feeding, as motive fluid to said ejector, the fluid from that of said conduits in which the pressure is higher, and thermostatic means, responsive to variations of temperature of the fluid mixture formed in the apparatus, for controlling the outlet of said ejector.

11. An apparatus for mixing together two fluids at different temperatures so as to automatically produce a mixture at a predetermined temperature, which comprises, in combination, a casing forming a mixing chamber, two inlet conduits for supplying the respective fluids at different temperatures to said mixing chamber, two valves for controlling the flow of the fluids from said conduits, respectively, into said mixing chamber, located one inside said mixing chamber and the other inside the conduit that it controls, a plate supporting both of said valves pivoted in said casing about an axis located on the same side of both of said valves, so that the opening of one of them corresponds to the closing of the other and the fluid pressure acting on said valves tends to simultaneously close one and open the other, a servo-motor including a structure forming at least one chamber of variable volume having a movable wall operatively connected with said mechanical means so as to act in opposition with the pressure of the fluid acting thereon, an ejector, operative by fluid under pressure, connected with said last mentioned chamber so as to exert a suction therein when in operation and to transmit therein the pressure of the motive fluid when not in operation, means for feeding, as motive fluid to said ejector, the fluid from that of said conduits in which the pressure is higher, and thermostatic means, responsive to variations of temperature of the fluid mixture formed in the apparatus, for controlling the outlet of the ejector.

AMÉDÉE COSTA DE BEAUREGARD.